April 3, 1928.

W. H. BOUTELLE 1,664,966

OPHTHALMIC TEMPLE

Filed Jan. 7, 1924

INVENTOR
WILLIAM H. BOUTELLE
BY
Harry H. Styll
ATTORNEY

Patented Apr. 3, 1928.

1,664,966

UNITED STATES PATENT OFFICE.

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC TEMPLE.

Application filed January 7, 1924. Serial No. 684,806.

The present invention relates to an improved form of ophthalmic temple, and has particular reference to a form of temple that may be used in connection with the so-called all zylonite frames, or gold frames having a covering of zylonite thereon.

A very important object of this invention is to provide a temple of this nature that will give the appearance of the so-called all zyl frame, but which will have an ear loop that will be concealed behind the ear of the user and which will not have a covering of cellulose composition material thereon.

Another object of this invention is to provide a temple of this nature that will have a covering of cellulose composition material arranged on the body portion thereof, but which will not have a heavy covering over the ear engaging portion so that a comfortable and yet nice appearing temple may be constructed for use in connection with the so-called all zyl mountings.

Other objects and advantages of the invention will become apparent during the course of the following description.

In the drawings, wherein like numerals are employed to designate like parts throughout the same:

Figure 1:
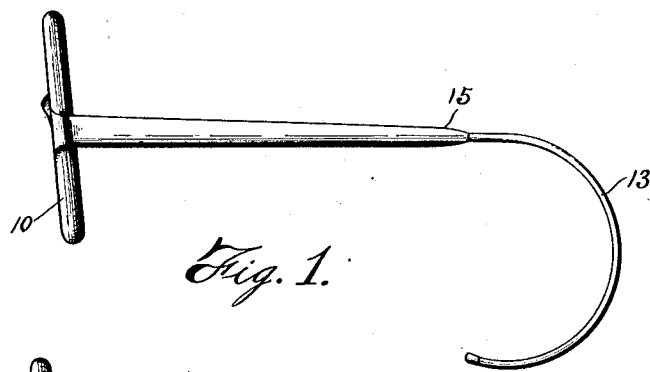
Figure 1 is a side elevation of an ophthalmic mounting illustrating my improved temple in connection therewith.

In the drawings, wherein for the purposes of illustration is shown the preferred embodiment of the invention, the numeral 10 designates an ophthalmic mounting which in the present instance illustrates the so-called all zylonite form.

Many persons who are desirous of wearing this form of all zylonite mounting find that the ear loop or ear engaging portion of the temple is too bulky and interferes with the pleasure of wearing such mountings. Ordinarily the temples used with this form of mounting consist of a metallic core and one or two wrappings of a cellulose composition material which it will be seen presents a rather heavy ear loop.

In the present invention I have so devised my temple that the desired form of mounting may be used without the objectionable feature of the bulkiness behind the ear, and to this end I provide a metallic frame 11 having a hinge connection 12 at one end and the ear loop 13 at the opposite end. The ear loop 13 may be of a plain wire construction, or if it is desired it may be of the so-called comfort cable construction, which consists of a coiled member which is flexible so as to conform to the various curvatures of the user's ear.

Figure 2:
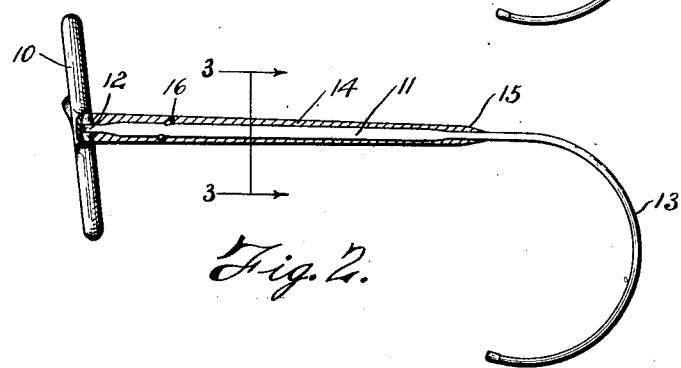
Figure 2 is a longitudinal section of the improved temple.

After forming the metallic frame 11 I slip a length of tubular stock 14 thereon, as is clearly illustrated in Figure 2 of the drawings. This tubular length of stock is preferably formed from a non-metallic material such as a cellulose composition which may be dyed or colored to the desired color. The rear end of the tubular member is tapered as at 15 to converge toward the metallic frame 11. Suitable barbs or the like 16 may be provided to prevent the tubular member 14 from slipping on the frame 11, or if desired cement may be used. It will be seen that the tubular stock 14 is arranged on the frame 11 to a point where the ear loop 13 bends around the ear so that the metallic portion will be the only portion contacting behind the ear of the user, although the tubular stock 14 will be in view in front of the ear. Of course, if it is desired a thin strip of zylonite may be wrapped around the ear loop 13.

Figure 3:
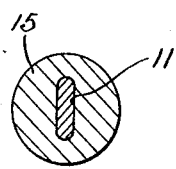
Figure 3 is a transverse section taken on the line 3—3 in Figure 2 and looking in the direction of the arrow.
Figure 4:
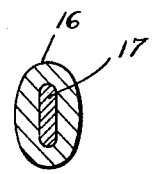
Figure 4 is a similar section of a modified form of the invention.
Figure 5:
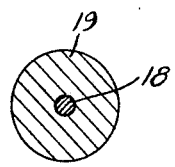
Figure 5 is another form of a modified construction.

In Figures 3, 4 and 5 are illustrated various forms or shapes that may be used, showing either the flat frame 12 in a circular tube 15, or in Figure 4 the flat frame 12 in the flattened tube 16. In Figure 5 a rounded frame 18 is arranged within the circular tubular member 19.

It is to be understood that the form of my invention herewith shown and described is to be taken as the preferred embodiment of the same, and that various changes in the size, shape and arrangement of parts may be resorted to without departing from the spirit of the invention or the scope of the subjoined claims.

Having thus described my invention, I claim:

1. A temple of the character described comprising an inner metallic temple consisting of a straight flattened side portion having its greatest width disposed in the vertical plane and a terminal ear loop portion circular in cross section and a seamless non-metallic outer tube covering the flattened side portion of the metallic temple and tapered down to the diameter of the ear loop portion adjacent the union of the ear loop and side portions of the inner temple.

2. A temple of the character described comprising an inner metallic temple consisting of a straight flattened side portion having its greatest width disposed in the vertical plane and a terminal ear loop portion circular in cross section and a seamless non-metallic outer tube covering the flattened side portion of the metallic temple and tapered down to the diameter of the ear loop portion adjacent the union of the ear loop and side portions of the inner temple, and projections on the side portion of the inner temple interengaging with the inner side of the tube of the outer portion.

WILLIAM H. BOUTELLE.